US007406677B2

(12) United States Patent
Colling

(10) Patent No.: US 7,406,677 B2
(45) Date of Patent: Jul. 29, 2008

(54) GENERATING PROGRAM CLASSES FOR USE WITH LOCALIZED RESOURCES

(75) Inventor: Aaron M. Colling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 861 days.

(21) Appl. No.: 10/464,332

(22) Filed: Jun. 18, 2003

(65) Prior Publication Data

US 2004/0261054 A1 Dec. 23, 2004

(51) Int. Cl.
G06F 9/44 (2006.01)
(52) U.S. Cl. ...................... 717/106; 717/143
(58) Field of Classification Search ........ 717/106–109, 717/136–137, 140–143
See application file for complete search history.

(56) References Cited

U.S. PATENT DOCUMENTS

| | | | | |
|---|---|---|---|---|
| 5,765,154 A | * | 6/1998 | Horikiri et al. | 707/10 |
| 6,920,630 B2 | * | 7/2005 | Jackson | 717/168 |
| 2003/0126310 A1 | * | 7/2003 | Ryzhov | 709/328 |

OTHER PUBLICATIONS

Liger, "Localization Support in Microsoft. NET Framework", 20th International Unicode Conference, Washington DC, pp. 1-25, Feb. 2002.*

Fermin Reig, "Annotations for Portable Intermediate Languages", Department of Computing Science, University of Glasgow, Scotland, UK, Published by Elsevier Science B.V., pp. 1-14, 2001.

Dragan Mirkovic, Rishad Mahasoom, Lennert Johnsson, "An Adaptive Software Library for Fast Fourier Transforms", pp. 215-224 ICS, 2000.

Fred Hommel, *Power to the Programmer, Byte 1989*, vol. 14, No. 13, pp. 199, 200, 202 (Dec. 1989), printed in the United States of America.

* cited by examiner

*Primary Examiner*—Ted Vo
(74) *Attorney, Agent, or Firm*—Workman Nydegger

(57) ABSTRACT

The present invention provides efficient mechanisms for passing localized resources into an executed file. To pass those localized resource values into an executable program, the invention provides for iterating over a resource file, and identifying one or more of the resource references contained within the resource file. The invention also provides for generating one or more corresponding program classes that flexibly treat the identified resource as a function or a property, depending on how one such as a developer calls the generated class. Thus, a developer will only need to refer to the generated class, rather than write a specific routine for a given resource within the resource file. And since a developer passes the generated class as a constant, a developer is more likely to find program errors at compile time before sending out the final product.

37 Claims, 4 Drawing Sheets

GENERATING PROGRAM CLASSES FOR USE WITH LOCALIZED RESOURCES

BACKGROUND OF THE INVENTION

1. The Field of the Invention

This invention relates to systems, methods, and computer program products for generating computer program code for use with localized resources on a client computer.

2. Background and Relevant Art

Computerized, electronic systems are increasingly common, in part because such computerized systems automate much of what people previously had to perform manually. Accordingly, computerized systems have added a certain amount of efficiency to people's ability to perform tasks. In general, computerized systems may comprise a wide variety of devices such as desktop or laptop computers, personal digital assistants, wireless and corded telephones, televisions, software applications, and even such seemingly mundane devices as toasters, and refrigerators. Computerized systems can be part of a platform and can run (or can be made to run) an operating system. Thus, for a computerized system such as a personal computer or wireless telephone to perform a requested function, the computerized system must be able to read and execute operating system (OS) or platform specific executable instructions that cause the computerized system to perform the function.

The process of generating executable instructions for a computerized system is somewhat involved. Ordinarily, a software developer must first think of the desired functions or results that the executable instructions are to perform and then enter corresponding text-format instructions, typically in the form of programming source code, into an electronic text file. In some cases, such as with interpreted programming languages (e.g., Javascript, Perl, etc.), a computerized system directly interprets entered text-format instructions, and performs the desired function. In other cases, such as with compiled programming languages (e.g., C#—pronounced "C sharp", C++, etc.), text-format instructions are first compiled into object or machine codes that the computerized system can execute. The computerized system can then execute the compiled object or machine codes to perform desired functions. Thus, executable instructions can be text-format instructions that are "interpreted" or can be compiled object or machine codes that are run.

After a software developer creates executable instructions (whether that be text-format or compiled instructions), a device manufacturer or end user must then enter or load the executable instructions into a computerized system for the instructions to be useful. This may be done by running an executable install file from a CDROM, downloading the executable instructions from a local or wide area network file server (e.g., Internet website), wireless uplink, etc. In short, there are a variety of ways to load executable instructions into a computerized system so that the computerized system can execute the executable instructions. Regardless of the loading procedure, however, for loaded executable instructions to be useful, a computerized system must be able to read the loaded executable instructions (hereinafter referred to as a "software program").

Computerized systems, however, can be less efficient for a desired function or may not even be able to perform a desired function when a software program that is to perform a desired function does not operate as intended. Failure to operate as intended can result from inadequacies in the software development process and/or software program malfunctions (often referred to as "bugs") when a software program is executed. Some software program malfunctions can have a significant detrimental effect on the operation of a computerized system, causing a complete inability of the executed software program, and potentially other software programs, to appropriately run on the computerized system.

Other software program malfunctions may be as mundane as the executed software program failing to output a correct word. For example, a software developer may misspell words or phrases in text-format instructions that are necessary to perform a function when the software program is executed. Sometimes these types of software malfunctions can be obvious to the programmer (e.g., every function but the misspelled function works), or can be unobvious (e.g., a video display goes blank and a generic "exception" message appears on the screen). Software malfunctions in a software program, especially those that are difficult to detect, can disrupt the intended functionality of the software program. More mundane software program malfunctions can also reduce a software developer's efficiency in writing text-format instructions as the software developer must often spend time trying to identify unobvious errors in text-format instructions.

Not surprisingly, there are a variety of automated ways that software developers develop and compile software so that the software developers can identify errors before they install, use, or sell the software program. As previously mentioned, a software developer may use a compiler to compile text-format instructions into object or machine codes that can be executed by a computerized system. Many compilers check text-format instructions for errors, and allow the software developer to "debug" errant text-format instructions. Such compilers, however, ordinarily look for illogical program code sequences (a missing bracket, missing if/then congruity, etc.).

In addition, there are of course non-automated (i.e., human) ways of checking text-format instructions for errors. For example, it is fairly common for teams of software developers to write code for a software program (or group of interrelated software programs). Utilizing a team of software developers has the added benefit of allowing several people familiar with or expert on the software product to check each other's code for errors. Utilizing a team of software developers, however, also has the added detriment of a greater potential for human errors, such as spelling errors. In addition, human error checking is often less desirable since software developers on very large projects may have limited time to review another's work. Thus, similar to automatic error detection mechanisms (e.g., in a compiler), software developers may be more inclined to look for overall program logic errors, and thus disinclined to review a text-format instructions with the specificity necessary to pick more mundane errors, such as, for example, spelling errors. Consequently, software programs having more code and greater numbers of software developers have the potential for greater numbers of such mundane errors that can cause a software program to fail, or deviate from the intended functionality.

As an example in some platforms, a software developer may write a software program that passes in localized resources, such as "string" resources (e.g. welcome_string="Hello '{name-id}', welcome to the program") and other related resource parameters, from a separate resource file that exists on the computerized system executing the software program. The resource file may include a number of resource identifiers such as string identifiers (e.g., name-id, language-id, or OS-id, etc.), and a series of corresponding resource (or string) values (e.g., "John", "Spanish", or "WinXP") that are used to represent different resources. For example, a resource file could contain the following resource identifiers and corresponding resource values written in text-format:
Welcome_String=Welcome
Earnings={0} earned ${1} last year These sorts of resource identifiers (i.e., Welcome_String, Earnings) and corresponding resource values represent resources that can allow a software program to be platform, or end-user-specific for a wide variety of parameters, even after the program is compiled. Treating resources separately from the main code in this manner facilitates a number of functions, such as translating (or "localizing") the string resources into different languages.

In some development environments, to cause a software program to access a certain resource such as a string value from a resource file, the software developer must enter another sequence of text-format instructions, or a "routine", that accesses the resource file for the corresponding certain resource identifier (e.g., string identifier). Accessing the resource file may occur prior to or after compiling the routine. In at least one case, the software developer enters text-format instructions enclosing a string identifier in quotation marks so that the compiler will not try to interpret the string identifier as a function or variable. Thus, a software developer might write, for example, get("Welcome_String"), rather than get(Welcome_String), where "get" is a function and "Welcome_String" is a string identifier that references a string value (i.e., "Welcome").

Software developers in such a development environment may also be required to write out a separate function each time the software developer wishes to pass this or a similar string resource from the resource file into the routine that will eventually be compiled. For example, a software developer might write text-format instructions to reference the named string identifiers from the previous resource file as follows:
ResourceManager resources=new System.Resources.ResourceManager("ClientStrings", this.GetType().Module.Assembly);
Console.WriteLine(resources.GetString("Welcome_String"));
String s=resources.GetString("Earnings");
s=String.Format (s, "John Doe", 5000);
Console.WriteLine(s);

Writing text-format instructions that access resources in a manner similar to the above example text format instructions is problematic for at least a few reasons. One reason is that using quotation marks around the string identifiers (i.e., "Welcome_String", and "Earnings") typically prevents compilers from checking for spelling errors in the string identifiers at compile time, making them harder to detect. Thus, the resulting software program may generate an "exception" at run-time (i.e., during an end-user's execution of the software program), as opposed to being identified by a developer during development of the software program.

For example, if the software developer enters the text-format instruction get ("Wel9comee_String") and the resource file instead contains a string identifier "Welcome_String", a compiler may not identify an error in this text-format instruction if other text-format instructions (e.g., a "get" command) that access the corresponding string resource are properly invoked. That is, the compiler will check the logic of the text-format instructions but typically will not check what is contained within quotes. A software program malfunction resulting from the spelling error may only become apparent when the software program containing the text-format instruction is executed by an end-user. For example, a software program could malfunction when trying to output a string from the resource file that corresponds to the "Welcome_String" identifier (i.e., "Welcome_String" exists in the resource file, but "Wel9comee_String" does not). In most cases, this will show up as a run-time "exception" that will be difficult for either the end-user or software developer to decipher (e.g., "exception error 10×01001—missing identifier") and/or correct.

To catch errors such as these, a software developer would ordinarily have to run all the code (before shipping the software program) that loads every string to make sure each string works properly. Presumably, normal software developer testing in this manner could identify many string errors (some strings, however, may be loaded in obscure error conditions). Unfortunately, in part due to the large number of text-format instructions in many end-user software programs, it is generally fairly easy for a developer to introduce an error late in the development process without realizing it.

Accordingly, systems, methods, and computer program products that aid software developers in developing software programs that have fewer errors and that reduce the lines of code a software developer enters to develop a software program would be advantageous. More particularly, systems, methods, and computer program products that reduce the potential for bugs to be entered into a computer readable program would also be advantageous.

BRIEF SUMMARY OF THE INVENTION

The foregoing problems with the prior state of the art are overcome by the principles of the present invention, which are directed towards methods, systems, and computer program products for generating a class source file based on one or more string references in a resource file. Specifically, the present invention provides for generating a series of initial text-format instructions that may be compiled or interpreted in conjunction with other text-format instructions to later reference identifiable resources in a resource file at the time of execution.

Particularly, in a software development environment where instructions may need to access localized resources when executing, the invention provides for iterating over (or parsing) a resource file containing certain identifiable resources. Identifiable resources may include culture-specific values (e.g., spoken language, operating system, platform, etc.) and string values (e.g., Client's name, occupation, income, etc.). One or more localized resources are identified (e.g., by an iteration module or software developer) in the resource file. First-text-format instructions for one or more classes are generated based on the identified resources.

Other, subsequently generated instructions (e.g., second text-format instructions) may reference or call the classes from the first-text instructions. The classes can be called flexibly such that identified resources can be treated as functions or as properties. Classes may be generated automatically or manually based on the software development environment. A generated class may be a class from any number of different programming languages, for example C# (pronounced "C sharp") C++, Java, etc.

In one embodiment, manually generated second text-format instructions gain access to the identified resources in the resource file by referencing one or more of the classes in the first text-format instructions. The first and second text-format instructions may be combined into combined instructions that cause a computerized system to perform a function based at least in part on an identified resource from the resource file. Alternatively, the computerized system may execute the instructions in combination, rather than as a separate combined file. Hence, the combined instructions (whether in a combined file or designed to run in combination) may be compiled into object or machine-readable code prior to execution. Alternatively, the combined instructions may be directly executed by an interpreter such that a computerized system executes the combined instructions in text-format (e.g., executable scripts). In either case, the combined instructions access the identified resource from the resource file when a computerized system executes the combined instructions.

Since the invention provides for generating text-format classes in advance based on identified resources in a localized resource file, the invention reduces the lines of text-format instructions that must be manually generated to access a resource from the localized resource file. And since the invention allows manually generated text-format instructions to call the first text-format instruction classes rather than the resource values, the manually generated text-format instructions do not need to manually enter certain resource values that may require the use of quotations (e.g., passing in strings). As a result, the present invention reduces the code writing burden for writing text-format instructions, and reduces the potential for coding errors since much of the sometimes redundant functional calls to resource files are generated in advance as referenced classes. Accordingly, when the developer knows that the compiler will check this with increased accuracy in such a development environment, the developer has a higher confidence level in the quality of the code that will be shipped.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for generating program classes for use with localized resources. The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
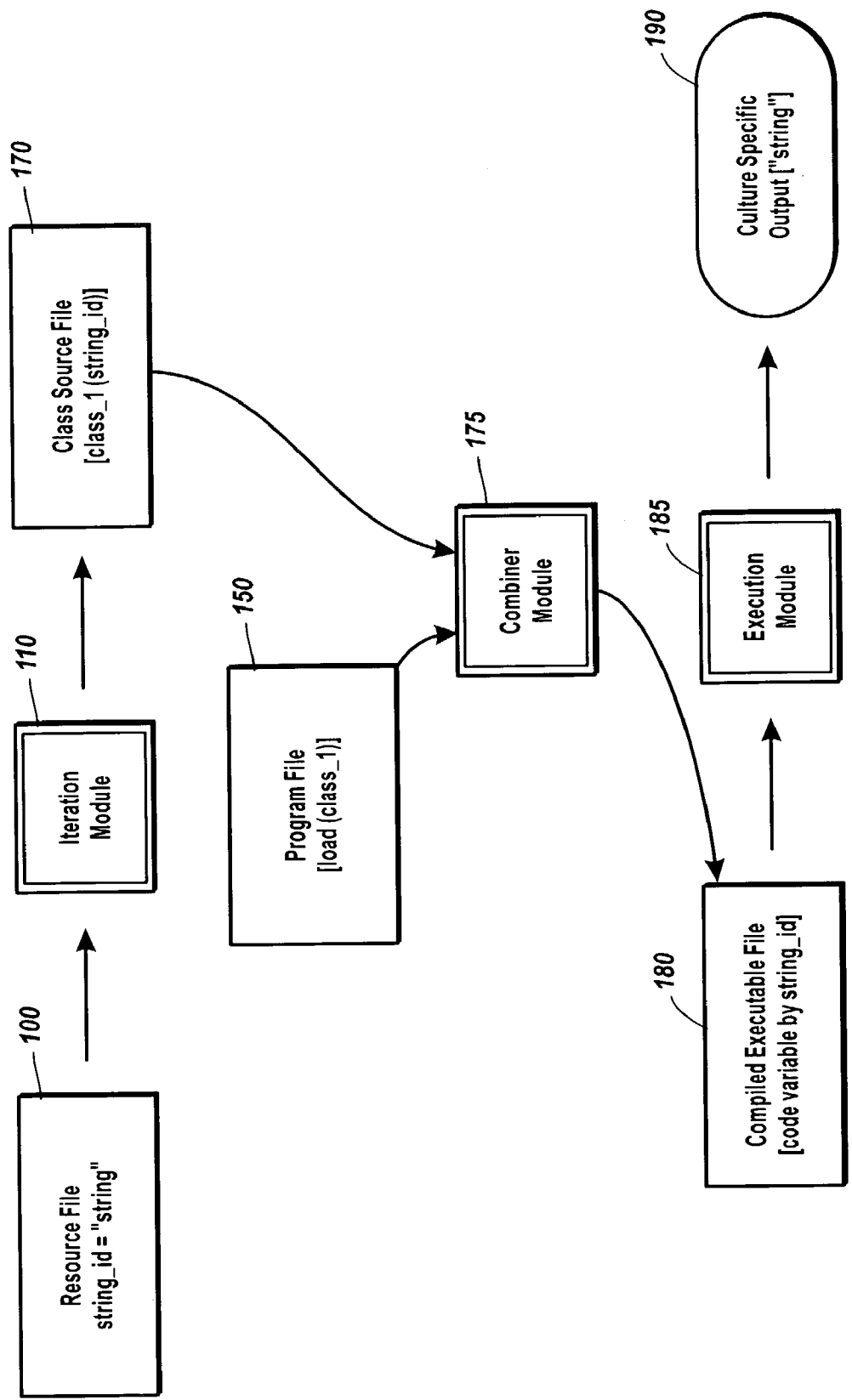
FIG. 1 illustrates an example computer system architecture that facilitates automatically generating and combining text format instructions in accordance with the present invention.

Turning now to FIG. 1, FIG. 1 illustrates an example computer system architecture that facilities generating program classes for use with localized resources in accordance with the present invention. FIG. 1 shows a plurality of single lined rectangles that represent data files, a plurality of double-lined rectangles that represent executable modules, and an oval that represents the output generated by instructions that implement the principles of the present invention. More specifically, resource file 100, class source file 170, program file 150, and compiled executable file 180, represent electronic files at a computerized system. Iteration module 110, compiler module 175 and execution module 185 represent executable modules at the computerized system. Culture-specific output 190 represents the output of execution module 185 performing culture-independent operations on the electronic files in accordance with the present invention.

In this specification, and in the following claims, the term "culture-independent function" refers to a function that operates the same regardless of culture. A culture-independent function can generate a culture-specific output by loading a culture-independent resource file having culture-specific resource values, such as an end-user's localized data (i.e. speaks U.S. English, runs Windows®, etc.). For example, in a Windows® Operating System a culture-independent function can identify and load culture-specific resource values link libraries (or ".dll" files) on an end-user's computer.

Resource file 100 contains localizable resources that can be accessed to cause an executable program to execute in a user-specific (or localized) manner. To accomplish this, resource file 100 might include a variety of identifiable resources that are potentially represented by unique resource identifiers (e.g., string_id), and corresponding resource values (e.g. "string"). The resource identifiers (also sometimes referred to as "resource references") are "unique" in the sense that they have the same name from resource file to resource file; but are "localized" in the sense that the resources will have differing values, depending on the configuration of the end-user computerized system.

For example, the resource file may include a unique name resource identifier and corresponding, localized (or end-user specific) name resource value (e.g., name_id="Nathan A. Person"). Similarly, the resource file may include a unique work resource identifier and a corresponding localized (or end-user specific) work resource value (e.g., work_id="Company, Inc."). In one embodiment, the following text might comprise a "strings" portion of a resource file:
  ; sample strings
  Welcome_String=Welcome
  Earnings={0} earned ${1} last year In the "sample strings" portion of the resource file, the unique string identifier Welcome_String has a corresponding string resource value of "Welcome". Similarly, the unique income resource identifier has an income resource value of "{0} earned ${1} last year", where a name (e.g., "Nathan A. Person") can be substituted for the "{0}" and a dollar amount (e.g., $50,000) can be substituted fro the "{1}" at run time.

Resource files can also include one or more computing system or end-user specific culture values (also sometimes referred to as "culture-specific" resource values), including but not limited to a spoken language (e.g., s_language="U.S. English"), an operating system (e.g., op_sys="Unix version 3.03"), a platform, or a language for an internal framework (e.g., framework_language="c#", framework_id="Microsoft .NET", etc.) A software writer that wishes to utilize these resources in some function or property will need to call the relevant resource identifiers (and add relevant arguments if necessary) from the resource file. Thus, a resource file might contain these and a wide variety of other unique, identifiable resources, and corresponding, localized resource values.

Accordingly, the invention provides for iterating over the resource file 100 to identify resources, and generating from the identified resources a class source file 170 for one or more of the identified resources. Iteration can be accomplished through iteration module 110, where iteration module 110 is an executable module that parses the resource file 100. Iteration can also, however, be accomplished for example by one or more persons visually inspecting the resource file 100 to identify the resources within the resource file 100. After iterating over the resource file, the invention provides for generating a class source file 170 based on any of the identified resources. The class source file 170 comprises a series of text-format instructions (hereinafter which may be referred to as "first text-format instructions") of a programming language. The one or more classes in class source file 170 provide access to one or more of the corresponding identified resources, and define what to do if a developer calls the resource as a function or as a property.

As illustrated in FIG. 1, class source file 170 contains a class that references the identifier "string_id" from resource file 100. With specific reference to the above-identified resources (i.e., Welcome_String, and Earnings), a class source file might contain the following example first text-format instructions written in the C# programming language:

```
internal static string Welcome_String
  {
  get
  {
    return GetString(Culture, "Welcome_String");
  }
  }
internal static string Earnings( object arg, object arg1 )
  {
    return GetString(Culture, "Earnings", arg, arg1 );
  }
```

In this example, these defined functions might constitute class interfaces of a composite class, perhaps a class known as "MyStrings". Although the example first text-format instructions are written in the C# programming language, the particular programming language is not important and a wide variety of other programming languages can be utilized to implement the principles of the present invention.

One should note that the class source file 170 can be generated automatically (e.g., by iteration module 110) or manually depending on the software development environment. For example, one or more developers may decide to generate the classes manually for each of the identified resources in advance and, from the identified resources, create the class source file 170. The one or more developers might then test the classes so that the developers know each of the classes will perform a desired function, the output of the desired function being modified by corresponding localized resource values on an end-user's computerized system.

Continuing, program file 150 comprises text-format instructions (hereinafter which may be referred to as "second text-format instructions") written in a programming language that may or may not be compilable, depending on the software development environment. The programming language can be any number of known programming languages such as C#, C, C++, Java, as well as any scripting language such as Javascript, Perl, etc. Regardless, the second text-format instructions reference one or more of the classes in the class source file 170 (e.g., load(class_1)). In part since the generated classes in class source file 170 define the identified resources, the developer does not need to reference, for example, class_1 in quotation marks. As a result, program file 150 accesses identified resources (e.g., string_id) by loading the corresponding class generated in the class source file 170. As illustrated in program file 150, "string_id" is accessed at run-time by loading "class_1", "class_1" having been generated for the class source file 170.

In addition, because these classes have been generated in advance, an initial or subsequent developer will be able to reference any of the generated classes in the class source file 170. Thus, the initial or subsequent developer can then access a generated class without having to re-enter the complete text format instructions representing the generated class. As a result, a developer can reference string values with far fewer lines of code, and without having to use quotation marks around the string identifiers. With respect to the above-mentioned string identifier "Welcome_String", a program file might contain the following example second text-format instructions:
Console.WriteLine(MyStrings.Welcome_String);
Console.WriteLine(MyStrings.Earnings("John Doe", "50000"));

As can be seen from this example, a developer does not need to write out an additional function for the string identifiers (i.e., Welcome_String and Earnings), and only passes the relevant, non-functional string values (i.e., "John Doe", and "50000") in quotation marks. Consequently, the invention both reduces the code writing burden, and helps ensure that quotes will not conceal potentially important functional errors that might be obscured from a compiler, such as misspelling a resource identifier.

At some point prior to execution, the first text-format instructions in class source file 170 and the second text-format instructions in the program file 150 can be combined to perform a desired output (e.g. culture-specific output 190). Accordingly, the invention provides for combining these two sets of instructions through a combiner module 175. Combiner module 175 can include a compiler that compiles the two sets of instructions to create a compiled executable file 180 that may later be executed. The compiler may be any one of a variety of known compilers (e.g., a C#, C, or Visual Basic compiler), and may compile the program file 150 and the class source file 170 separately, to create two separate sets of machine readable code, or may create a single machine readable executable file 180. One of ordinary skill in the art will appreciate after reading this disclosure that the combiner module 175 may also be capable of combining the two sets of instructions into an executable file of non-compiled instructions. This executable file of non-compiled instructions may be an executable script that can be interpreted by an interpreter (e.g., included in execution module 185).

The execution module 185 can include an operating system for executing a compiled, machine-readable file (e.g., executable file 180), or can include an interpreter program that will take an executable file of non-compiled text-format instructions and cause the computerized system to create a culture-specific output (e.g. culture-specific output 190). In either case, the execution module 185 will execute combined culture-independent instructions to create culture-specific output 190. Execution module 185 can then reference unique resource identifiers from resource file 100 to provide a localized output based on the corresponding resource values. For example, FIG. 1 shows executable file 180 having instructions that are a combination of the instructions in program file 150 and class source file 170, modifiable by the resource values from resource file 100. Accordingly, the execution module 185 causes the computerized system to perform culture-independent function having a culture-specific output 190 based on the resource value (i.e., "string").

Figure 2:
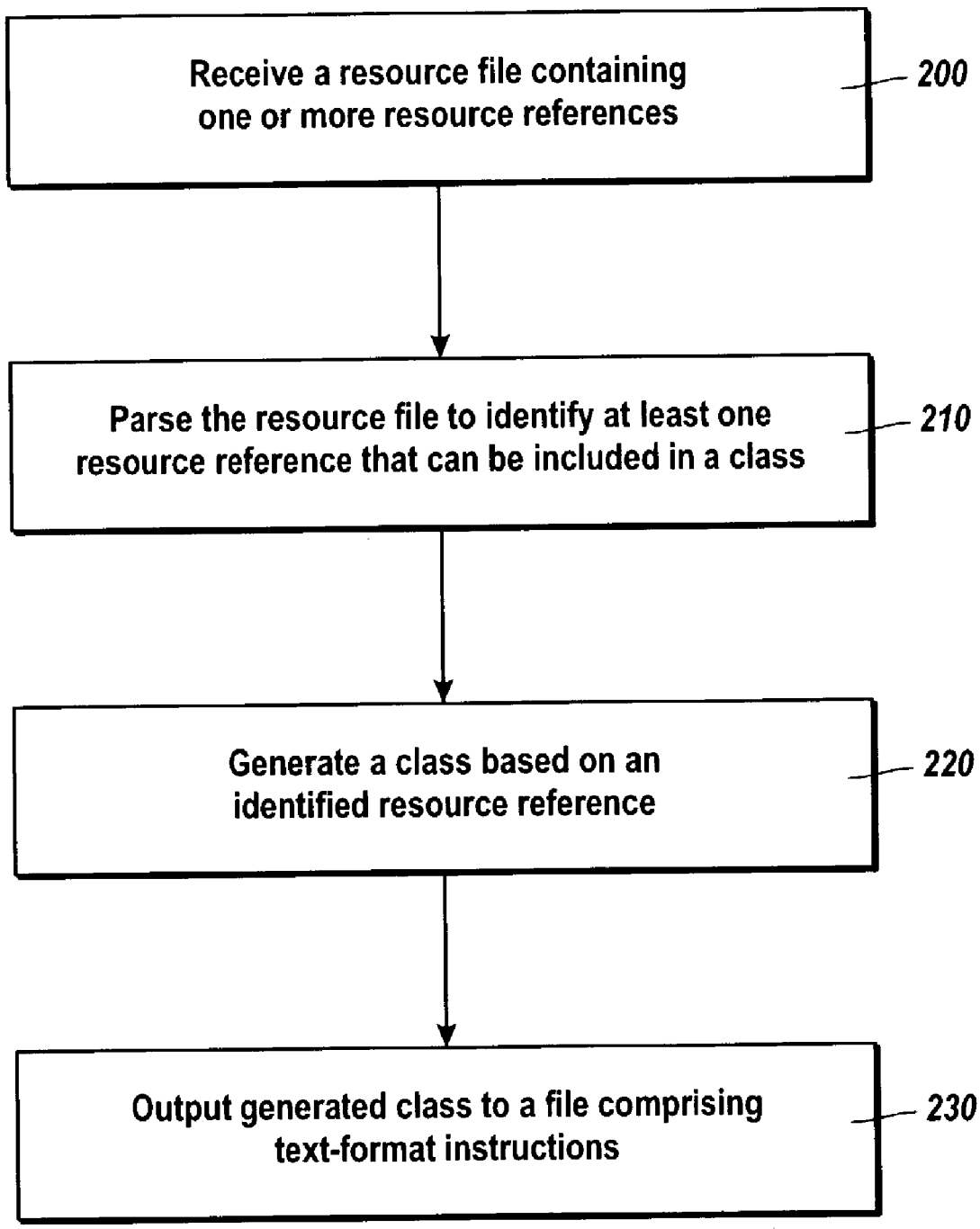
FIG. 2 illustrates an example flow chart of a method for automatically generating at least a portion of text-format instructions that can be combined into in computer-executable instructions in accordance with the present invention.

The present invention may also be described in terms of methods, comprising functional steps and/or non-functional acts. FIG. 2 illustrates an example flow chart of a method for automatically generating at least a portion of text-format instructions that can be combined into computer-executable instructions in accordance with the present invention. The method of FIG. 2 will be discussed with respect to the executable modules and files in FIG. 1.

The method of FIG. 2 includes an act 200 of receiving a resource file containing one or more resource references. Act 200 can include receiving a resource file containing one or more resource references and one or more corresponding resource values. For example, the iteration module 110 may receive the resource file 100, which includes the string reference "string_id" and the corresponding string value of "string". As already stated, these localized resources from a resource file may include any generic variety of resources that enable programs to perform end-user specific functions, such as, localized functions based on language, operating system, etc. For example, in the computerized system environment of FIG. 1 functions can be localized based on string reference values found in the resource file 100.

The method of FIG. 2 includes an act 210 of parsing the resource file to identify at least one resource reference that can be included in a class. Act 210 can include automatically parsing the resource file to identify at least one resource reference that can be included in a class. For example, the iteration module 110 can parse resource file 100 by iterating over resource file 100 to identify appropriate string references (e.g., a unique resource reference such as "string_id").

The method of FIG. 2 also includes an act 220 of generating a class based on an identified resource reference. Act 220 can include automatically generating a class, having one or more class interfaces and providing text-format instructions with access to a resource value, based on an identified resource reference. For example, upon identifying one or more unique resource references, the iteration module 110 can automatically generate a programming class based on the identified, unique resource reference. A programming class can be a class as understood in a variety of programming languages, and may include one or more class interfaces. In addition, a programming class can provide other, manually generated, text-format instructions with access to the corresponding resources references.

The method of FIG. 2 further includes an act 230 of outputting the generated class to a file comprising text-format instructions. Act 230 can include outputting the one or more automatically generated classes to a file comprising automatically generated text-format instructions. For example, after iteration module 110 has automatically generated one or more classes, iteration module 110 can output the one or more automatically generated classes to the class source file 170, the class source file 170 comprising text-format instructions. Accordingly, this pre-generated class source file 170 can provide a software developer convenient access to the resources in the resource file 100 through one or more corresponding classes in a class source file (e.g., class source file 170).

Figure 3:
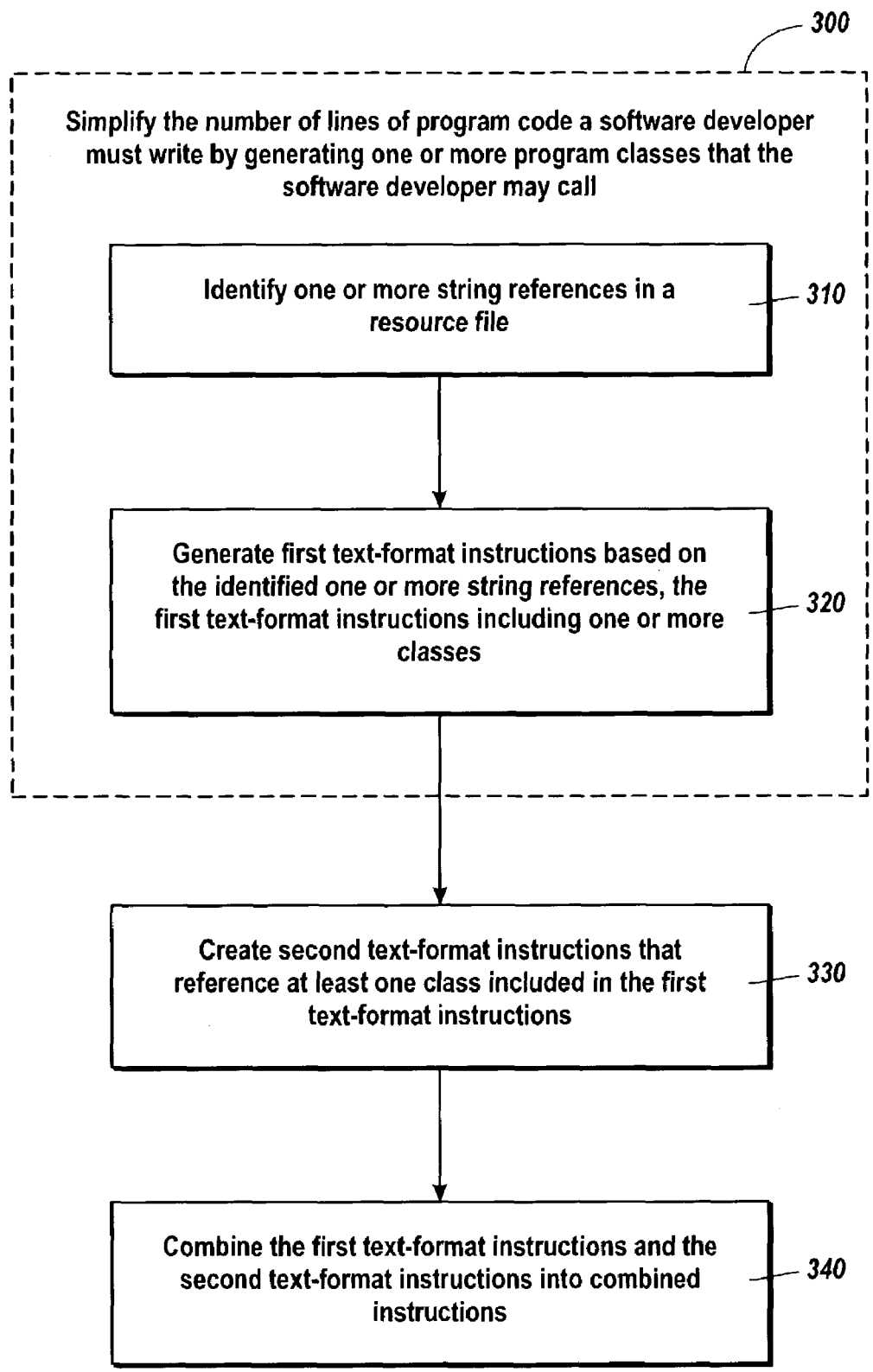
FIG. 3 illustrates an example flow chart of a method for combining at least a portion of text-format instructions into computer-executable instructions that can be executed to perform a localized function in accordance with the present invention.

FIG. 3 illustrates an example flow chart of a method for combining at least a portion of text-format instructions into computer-executable instructions that can be executed to perform a localized function in accordance with the present invention. Similar to FIG. 2, the method of FIG. 3 will be described with respect to the executable modules and files depicted in FIG. 1. The method of FIG. 3 includes a functional result-oriented step 300 for simplifying the number of lines of program code a software developer must write by generating one or more program classes that the software developer may call. This functional step 300 can include any corresponding acts that, when performed, have the result of simplifying the number of lines of program code a software developer must write by generating one or more program classes that the software developer may call.

However in FIG. 3, step 300 includes a corresponding act 310 of identifying one or more resource references in a resource file. Act 310 can be performed, for example, by an iteration module 110 that parses or iterates over resource file 100, the resource file including the resource reference "string_id" and the resource value of "string". Iteration module 100 may thus identify the resource "string_id" as a string resource reference. Step 300 can also include a corresponding act 320 of generating first text-format instructions based on the identified one or more resource references, the first text-format instructions including one or more classes. For example, upon identifying string references from resource file 100, iteration module 110 might generate programming classes that provide access to the string references.

Step 300 can also include generating first text-format instructions based on the identified one or more string references, the first text-format instructions including one or more classes that correspond to the identified one or more resource references. For example, as noted in FIGS. 1 and 2, upon identifying one or more unique resource references, the iteration module 110 can automatically generate class source file 170 having one or more programming classes that correspond to the identified one or more unique resource references. As already noted herein, a programming class can be a class as understood in a variety of programming languages, and may include one or more class interfaces. In some embodiments, it may be that a developer manually generates programming classes based on one or more identified string references. Similarly, a developer may generate a programming class with one or more class interfaces that provide functions or properties for corresponding identified resource values found in resource file 100.

The method of FIG. 3 also includes an act 330 of creating second text-format instructions that reference at least one class included in the first text-format instructions (e.g., from act 320). More specifically, act 330 can include creating second text-format instructions that reference at least one class included in the first text-format instructions, the at least one class providing access to an identified resource reference from resource file 100. For example, a developer may create second text-format instructions in program file 150, the instructions designed to cause the computerized system to perform a function that produces localized output.

The method of FIG. 3 also includes act 340 of combining the first text-format instructions (e.g., class source file 170) and the second text-format instructions (e.g., program file 150) into combined instructions. In particular, act 340 may include combining the first text-format instructions and the second text-format instructions into combined instructions, wherein at least one of the combined instructions calls the identified resource reference. Thus, for example, combiner module 175 (e.g., through a compiler) may take program file 150 and class source file 170 as inputs, and combine the files into separate, machine-readable executable files where a machine-readable executable file corresponding to program file 150 references a machine-readable executable file corresponding to class source file 170 to perform a function. Alternately, combiner module 175 can combine program file 150 and class source file 170 into a single machine-readable executable file, such as compiled executable file 180.

In some embodiments, the combiner module 175 combines program file 150 and class source file 170 into combined text-format instructions that can be interpreted by an interpreter in an execution module 185. Regardless, in either the compiled or interpreted case, the combined instructions cause a computerized system to perform a culture-independent function upon execution by execution module 185. The function may comprise localized output that is based on the identified resource from resource file 100, such as outputting an end-user's name.

In some embodiments, the present methods as described in FIGS. 2 and 3 may be directed additionally to functions that produce culture-specific output, the output based on the resources contained in a resource file. Such a function might be in lieu of, or in addition to localized-resource based output that includes localized string output. As noted, culture-specific resource values can include a wide variety of values including, a spoken language, an operating system, a framework, a programming language, a written language, etc. Thus, in a computerized system environment including text-format instructions that can be combined into computer-executable instructions, one embodiment of the present invention includes a method of automatically generating at least a portion of the text-format instructions in advance, wherein the text-format instructions include one or more classes corresponding with one or more culture-specific resources identified from a resource file.

As with the other implementations contained herein, this mechanism not only allows simplifying the generation of a localized output on a computerized system; but also increases the likelihood of identifying errors that can potentially occur when the computer-executable instructions are executed, and also minimizes the lines of code that are manually generated. Accordingly, the methods of FIGS. 2 and 3 can easily be implemented to perform this embodiment. Thus, one embodiment for implementing culture-specific output can include an act of electronically iterating over an electronic resource file, wherein the resource file comprises one or more string references for one or more culture-specific string values, and wherein at least one of the one or more string references in the resource file is identified.

For example, iteration module 110 may identify a culture-specific resource upon parsing a resource file, such as resource file 100. Upon recognizing at least one of the culture-specific string values, the inventive method may then perform an act of automatically generating a class source file comprising one or more compilable classes that correspond with each identified string reference, the classes including one or more class interfaces. Iteration module 110 may also automatically generate one or more culture-independent classes, and one or more class interfaces that correspond to the identified culture-specific string reference.

The generated class or class interface can flexibly define how an execution module (e.g., execution module 185) treats the resource value, such as treating the value as a property or a function. The execution module (e.g. 185) can treat the resource value flexibly depending, for example, on the nature of the, resource, or perhaps on the number of additional arguments included with a call to the resource value (e.g., "Nathan has {argument 1} jobs, and lives in {argument 2} city"). The present implementation also provides for creating a compilable program file (e.g., program file 180) that includes program code, and a program call to one or more compilable classes and associated class interfaces in the generated class source file (e.g., class source file 170). Therefore, creating this class source file (e.g., 170) in advance (where the class source file includes flexible classes) allows a developer to write program instructions that call the automatically generated culture-independent classes.

In this specification and in the following claims, the term "culture-independent class" is defined as a constant, generated program class. Thus, a culture-independent class will operate similarly regardless of culture. The output of objects derived from a culture-independent class can be, however, altered by culture-specific resource values. Culture-independent classes allow a developer the flexibility to deal with the identifiable resources as a property or a function. That is, a culture-independent class may be generated with one or more flexible interfaces that recognize how to treat differently-input resource values, whereby one class interface may treat a resource value as a function in one case, and the same or different class interface may treat a resource value as a property in another case.

After one or more developers have generated the program file (e.g., program file 150) that calls one or more classes from the automatically generated class source file (e.g., class source file 170), FIGS. 2 and 3 may be additionally implemented in some embodiments for an additional act of compiling the program file and the class source file into one or more executable files. The compiled program machine-readable code can be a single compiled file, or can be compiled and executed by a computerized system as a combination of compiled instructions from multiple files. Either way, when a computerized system executes the compiled program (e.g., program file 150) and class source file (e.g., class source file 170), the compiled instructions cause a computerized system to perform an act of referencing the localized resource file for the culture-specific string value related to the associated class, thereby applying the culture-specific string value to the output as appropriate.

For example, if the identified culture-specific string (or resource) value for language_id is "English U.K.", the functional output might recite "flat" instead of "apartment" (U.S. English synonym). Or, alternatively, if the identified culture-specific string value for an operating system (e.g., "os_id") is "Windows XP", the computerized system might only perform the written function if the system has the Windows XP operating system installed on it. As well, the identified string value may be a simple, localized string value, such that the computerized function outputs a localized end-user's name (e.g., "Hello Nathan"). One will therefore appreciate after reading this disclosure that there are a variety of ways of implementing the described mechanisms.

Embodiments of the present invention can be implemented to increase the likelihood of identifying string errors earlier in the development process. Accordingly, developers can have increased confidence in the quality of the code that will be shipped.

Figure 4:
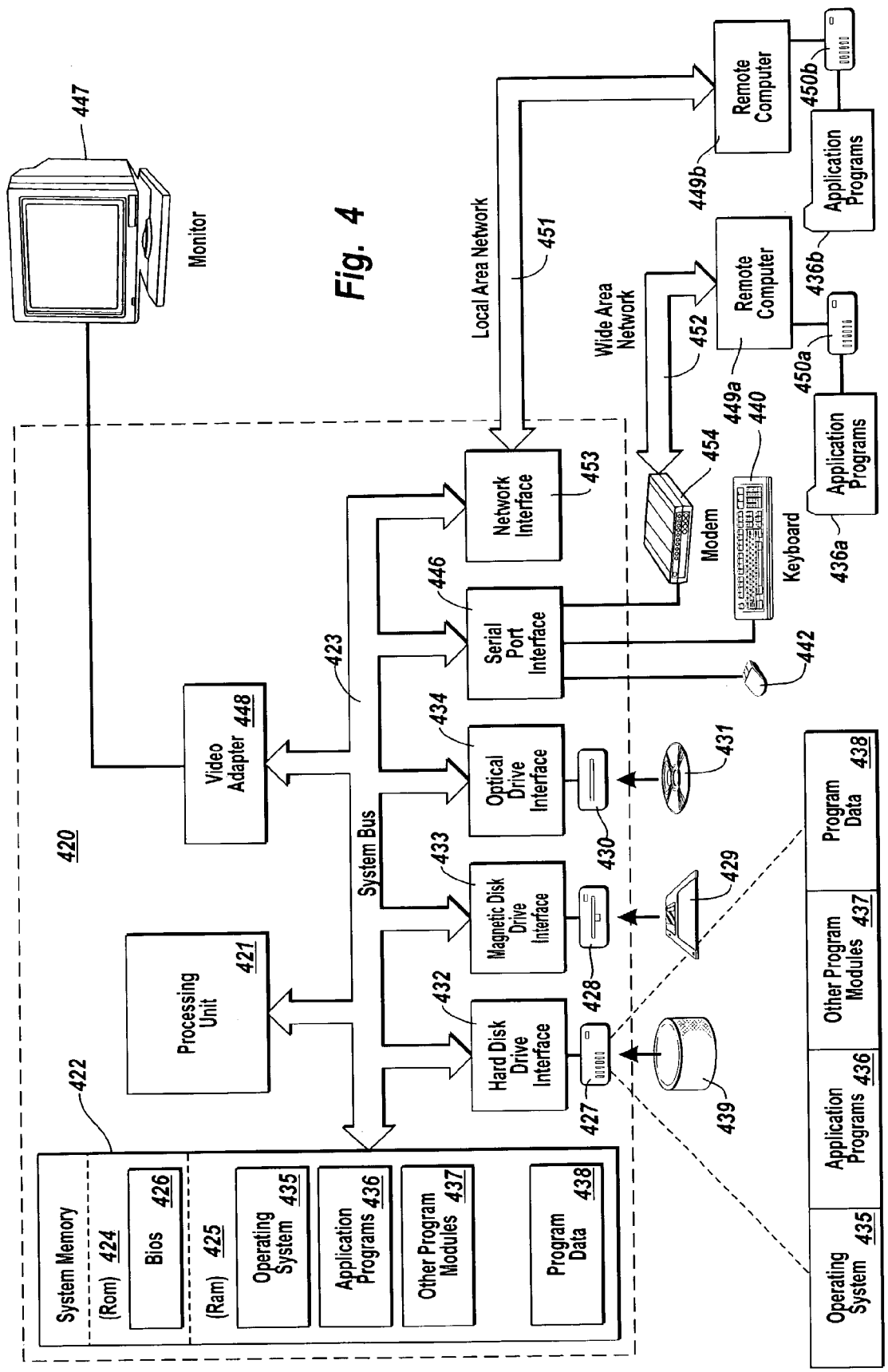
FIG. 4 illustrates an exemplary computing system environment for practicing the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, and/or data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general-purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here byway of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. In a computerized system environment including text-format instructions that can be combined into computer-executable instructions, a method of automatically generating at least a portion of the text-format instructions that can be combined into computer-executable instructions to increase the likelihood of identifying errors that can potentially occur when the computer-executable instructions are executed, and to thereby minimize the lines of code that are manually generated, the method comprising acts for:

receiving a resource file containing one or more resource references and one or more corresponding resource values;

automatically parsing the resource file to identify at least one resource reference that can be included in a class;

automatically generating a class based on the identified at least one resource reference, the class comprising one or more class interfaces and text-format instructions capable of accessing, at run time, the resource file and obtaining a corresponding at least one resource value; and outputting the automatically generated class to a file including automatically generated text-format instructions capable of accessing, at run time, the resource file to call the corresponding at least one resource value.

2. The method of claim 1, further comprising an act of manually creating text-format instructions that reference at least one class from the automatically generated text-format instructions.

3. The method of claim 2, further comprising combining the manually generated text-format instructions and the file including automatically generated text-format instructions into combined instructions, wherein at least one of the combined instructions calls an identified resource reference.

4. The method of claim 3, wherein the act of combining the manually generated text-format instructions and the file including automatically generated text-format instructions into combined instructions comprises an act of compiling the file including automatically generated text-format instructions into machine-readable code that, when the machine-readable code is executed, accesses one or more resources values from the resource file.

5. The method of claim 1, wherein the act of outputting the one or more automatically generated classes to a file including automatically generated text-format instructions comprises an act of outputting the one or more automatically generated classes to a file that can be interpreted by an interpreter.

6. The method of claim 1, wherein act of automatically parsing the resource file to identify at least one resource reference that can be included in a class comprises an act of automatically parsing the resource file to identify at least one resource reference that is at least one of a string resource value, and a culture-specific resource value.

7. The method of claim 6, the method as recited in claim 6 wherein the act of automatically parsing the resource file to identify at least one resource reference that is at least one of a string resource value, and a culture-specific resource value comprises an act of automatically parsing the resource file to identify a culture-specific resource value, the culture-specific resource value being one or more of a spoken language value, a computer platform value, a framework value, and a programming language value.

8. In a computerized system environment including text-format instructions that can be combined into computer-executable instructions, a method of combining at least a portion of text-format instructions into computer-executable instructions that can be executed to perform a localized output based on resources in a resource file, the method comprising acts for:

identifying one or more resource references in a resource file;

generating first text-format instructions based on the identified one or more resource references in the resource file, the first text-format instructions including one or more classes based on the identified one or more resource references and capable of accessing, at run time, the resource file to obtain a corresponding resource reference from the resource file;

creating second text-format instructions that reference at least one class generated in the first text-format instructions, the at least one class providing access to the resource file so as to obtain an identified resource reference from the resource file; and combining the first text-format instructions and the second text-format instructions into combined instructions, wherein at least one of the combined instructions calls the identified resource reference.

9. The method of claim 8, wherein the act of combining the first and second text instructions comprises an act of compiling the first and second text instructions into machine-readable code prior to executing the instructions.

10. The method of claim 8, wherein the act of combining the first and second text instructions comprises an act of combining the first and second text instructions into combined text format instructions that can be interpreted by an interpreter.

11. The method of claim 8, wherein the act of creating second text-format instructions that reference at least one class in the first text-format instructions comprises an act of creating second text-format instructions that call at least one class from the first-text format instructions.

12. The method of claim 8, wherein the act of identifying one or more resource references in a resource file comprises an act of identifying a resource reference that is one or more of a string reference and a culture-specific resource reference.

13. The method of claim 12, wherein the act of identifying a resource reference that is one or more of a string reference and a culture-specific resource reference comprises an act of identifying at least one resource reference that is a culture-specific resource reference, the culture-specific resource reference being one or more of a spoken language resource reference, a computer platform resource reference, a framework resource reference, and a programming language resource reference.

14. In a computerized system environment including text-format instructions that can be combined into computer-executable instructions, a method of automatically generating at least a portion of the text-format instructions that can be combined into computer-executable instructions to increase the likelihood of identifying errors that can potentially occur when the computer-executable instructions are executed, and to thereby minimize the lines of code that are manually generated, the method comprising:

a step for simplifying the number of lines of program code a software developer must write by generating first text-format instructions that include one or more program classes based on one or more resource references in a resource file, at least one of the classes capable of accessing, at execution, the resource file to access one or more resource references found in the resource file;

an act of creating second text-format instructions that reference at least one class generated in the first text-format instructions instead of the resource file or resource references in the resource file, the at least one class providing access to the resource file so as to obtain an identified string reference from the resource file; and an act of combining the first text-format instructions and the second text-format instructions into combined instructions, wherein at least one of the combined instructions calls the identified string reference upon execution.

15. The method of claim 14, wherein the step for simplifying the number of lines of program code a software developer must write includes:

a corresponding act of identifying one or more resource references in a resource file; and a corresponding act of generating first text-format instructions based on the identified one or more resource references, the first text-format instructions including one or more classes based on the identified one or more resource references.

16. In a computerized system environment including text-format instructions that can be combined into computer-executable instructions, a method of automatically generating at least a portion of the text-format instructions that can be combined into computer-executable instructions to increase the likelihood of identifying errors that can potentially occur when the computer-executable instructions are executed, and to thereby minimize the lines of code that are manually generated, the method comprising acts for:

electronically iterating over an electronic resource file, wherein the resource file comprises one or more string references for one or more culture-specific string values, and wherein at least one of the one or more string references in the resource file is identified;

automatically generating a class source file comprising one or more classes that correspond with each identified string reference, the classes including one or more class interfaces;

creating a program file that includes program code, the program code including a program call to one or more classes in the class source file;

combining the program file and the class source file into one or more executable files capable of calling the reference file at execution to obtain the identified string reference; and referencing the resource file for the culture-specific string value related to the associated class when executing the one or more executable files, thereby applying the culture-specific string values to the associated class as appropriate.

17. The method of claim 16, wherein the act of combining the program file and the class source file into one or more executable files comprises an act of compiling the class source file along with text-format instructions that call a class included in the class source file.

18. The method of claim 16, wherein the act of combining the program file and the class source file into one or more executable files comprises an act of combining the program file and the class source file into text-format instructions that can be interpreted by an interpreter.

19. The method of claim 16, wherein the act of automatically generating a class source file comprising one or more classes comprises an act of generating a class source file comprising one or more culture-independent classes.

20. The method of claim 16, wherein the act of creating a program file comprises an act of creating a program file including a program call to wherein the one or more classes called by the program call in the created program file are culture-independent classes.

21. The method of claim 16, wherein the act of referencing the resource file for the culture-specific string value related to the associated class comprises an act of applying the culture-specific string values to associated culture-independent classes as appropriate.

22. The method of claim 16, wherein at least one identified string reference includes a culture-specific string value, the culture-specific string value being one or more of a spoken language value, a computer platform value, a framework value, and a programming language value.

23. The method of claim 22, wherein the culture-specific string value indicates that the text-format instructions are written to be executed in a .NET environment.

24. The method of claim 23, wherein the culture-specific string values refers to the C# programming language.

25. A computer program product for use in a computerized system environment including text-format instructions that can be combined into computer-executable instructions, the computer program product for implementing a method of combining at least a portion of text-format instructions into computer-executable instructions that can be executed to perform a localized output based on resources in a resource file, the computer program product comprising one or more computer-readable media having stored thereon computer executable instructions that, when executed by a processor, cause the computerized system to perform the following:

identify one or more resource references in a resource file;

generate first text-format instructions based on the identified one or more resource references, the first text-format instructions including one or more classes based on the identified one or more resource references;

create second text-format instructions that reference at least one class generated in the first text-format instructions, the at least one class providing access to the reference file to obtain access to an identified resource reference from the resource file; and combine the first text-format instructions and the second text-format instructions into combined instructions, wherein at least one of the combined instructions provides access to the resource file to calls the identified resource reference.

26. The computer program product as recited in claim 25, wherein the one or more computer-readable media are physical media.

27. The computer program product as recited in claim 25, wherein the one or more computer-readable media include system memory.

28. A computer program product for use in a computerized system environment including text-format instructions that can be combined into computer-executable instructions, the computer program product for implanting a method of automatically generating at least a portion of the text-format instructions that can be combined into computer-executable instructions to increase the likelihood of identifying errors that can potentially occur when the computer-executable instructions are executed, and to thereby minimize the lines of code that are manually generated, the computer program product comprising one or more computer-readable media having stored thereon computer executable instructions that, when executed by a processor, cause the computerized system to perform the following:

receive a resource file containing one or more resource references and one or more corresponding resource values;

parse the resource file to identify at least one resource reference that can be included in a class;

generate a class based on the identified at least one resource reference, the class comprising one or more class interfaces, and text-format instructions capable of accessing, at run time, the resource file and obtaining a corresponding at least one resource value; and output the generated classes to a class file including automatically generated text-format instructions capable of accessing, at run time, the resource file and calling the corresponding at least one resource value.

29. The computer program product of claim 28, further comprising computer-executable instructions that receive manually created text-format instructions that reference a generated class in the class file.

30. The computer program product of claim 29, further comprising computer-executable instructions that combine the received manually created text-format instructions and the class file into combined instructions, wherein at least one of the combined instructions calls an identified resource reference.

31. The computer program product of claim 30, wherein the executable instructions that combine the manually created text-format instructions and the class file into combined instructions comprise computer-executable instructions that compile the class file into machine-readable code that, when the machine-readable code is executed, calls one or more string values from the resource file.

32. The computer program product of claim 28, wherein the class file can be interpreted by an interpreter.

33. The computer program product of claim 28, wherein an identified resource reference includes at least one of a string resource value, and a culture-specific resource value.

34. The computer program product of claim 28, wherein at least one identified resource reference corresponds to a culture-specific resource value, the culture-specific resource value being one or more of a spoken language value, a computer platform value, a framework value, and a programming language value.

35. The computer program product of claim 28, wherein the resource file includes a culture-specific resource value for a .NET framework, and wherein the automatically generated text-format instructions includes one or more C# classes.

36. The computer program product as recited in claim 28, wherein the one or more computer-readable media are physical media.

37. The computer program product as recited in claim 28, wherein the one or more computer-readable media include system memory.

* * * * *